(No Model.) 7 Sheets—Sheet 2.
W. ALDRICH.
CASH REGISTER AND INDICATOR AND CHECK MACHINE.

No. 481,459. Patented Aug. 23, 1892.

(No Model.) 7 Sheets—Sheet 3.

W. ALDRICH.
CASH REGISTER AND INDICATOR AND CHECK MACHINE.

No. 481,459. Patented Aug. 23, 1892.

Fig. 3.

Witnesses
Chas. J. Williamson
Henry C. Hazard.

Inventor
Wales Aldrich
by Prindle and Russell
his Attorneys (No Model.) 7 Sheets—Sheet 4.

W. ALDRICH.
CASH REGISTER AND INDICATOR AND CHECK MACHINE.

No. 481,459. Patented Aug. 23, 1892.

Witnesses
Chas. J. Williamson
Henry C. Hazard

Inventor
Wales Aldrich
by Prindle & Russell
his Attorneys

(No Model.) 7 Sheets—Sheet 6.
W. ALDRICH.
CASH REGISTER AND INDICATOR AND CHECK MACHINE.
No. 481,459. Patented Aug. 23, 1892.

Witnesses
Chas. J. Williamson
Henry C. Hazard.

Inventor
Walt. Aldrich
by Prindle & Russell
his Attorneys

UNITED STATES PATENT OFFICE.

WALES ALDRICH, OF DAYTON, OHIO.

CASH REGISTER AND INDICATOR AND CHECK-MACHINE.

SPECIFICATION forming part of Letters Patent No. 481,459, dated August 23, 1892.

Application filed July 5, 1888. Serial No. 278,998. (No model.)

*To all whom it may concern:*

Be it known that I, WALES ALDRICH, of Dayton, in the county of Montgomery, and in the State of Ohio, have invented certain new and useful Improvements in Cash-Registering Apparatus; and I do hereby declare that the following is a full, clear, and exact description thereof, reference being had to the accompanying drawings, in which—

Fig. 13, a detail view in elevation, showing a modified form of the diagonal bearing-bar to be engaged by the series of levers.

Letters of like name and kind refer to like parts in each of the figures.

The object of my invention is to provide certain improvements in cash registering and indicating apparatus or machines and to provide apparatus of this class with means for issuing checks.

To this end my invention consists in the apparatus and in the construction, arrangement, and combination of the parts thereof, as hereinafter specified.

In the drawings, A A designate the two upright side or end plates of the frame which I use to support the operative parts of my apparatus, and A' A' two bars connecting the lower ends of the plates A A at their front and rear sides, respectively. These transverse bars are preferably of the form shown—that is, flat, with a longitudinal upwardly-projecting side frame on their upper faces; also, connecting the two side frame-plates A A is the elevated plate $A^2$, attached at its ends to vertical flanges or ribs $a'\,a'$ on the inner sides of such frame-plates.

I have shown no casing for my apparatus, as any desired form thereof can be used without departure from my invention. Whatever the kind or form of casing, it should have the usual elevated display-opening to allow the figures on any raised indicator-tablets to be seen, and also a suitable opening to allow access to the registering mechanism, such opening being provided with any desired means for closing it to prevent manipulation of the mechanism by unauthorized persons.

Extending across the machine from one side plate A to the other and fastened at its opposite ends to such plates near their rear sides or edges is the horizontally-arranged elevated plate B, having for stiffening purposes a downwardly-turned rib or flange $b\,b$ along its front and rear edges, respectively. A similarly constructed and arranged plate B', with flanges $b'\,b'$, is situated vertically under the plate B, being at its ends fastened to horizontal lugs or short ribs $a^2\,a^2$ on the inner sides of the frame-plates A A. The upper plate B can be fastened to similar lugs on the side frame-plates or directly to the tops of the latter.

Extending across the front of the frame is the shaft C, upon which are pivoted the key-levers D D D, which can be of any desired number. I prefer, however, to have them of the number shown in the drawings—that is, twenty-nine. Of these the one at the extreme right is a blank or unnumbered key, for a purpose to be described hereinafter. Of the remaining keys the nine at the right are the cent-keys, and are numbered or provided with figures running from "1" to and including "9,"

consecutively, the "1" key being that to the right of the series. In the next series of nine the keys are numbered, consecutively, "10," "20," "30," and so on by tens, up to and including "90," while the remaining ten keys at the left of the whole series of keys are the dollar-keys, and are numbered consecutively from right to left "$1," "$2," "$3," and so on, up to and including "$10."

Pivoted to the shaft C beyond the opposite ends of the entire series of key-levers are the pivotal arms of the swinging frame E, whose cross-bar extends across and rests upon the key-levers near their rear ends. This frame is the usual and well-known device employed for securing actuation of the alarm mechanism whenever a key-lever is moved to make an indication. To limit the upward swing of this frame and therefore of the rear ends of the key-levers, I provide stops on the frame-plates A A, each of such stops preferably consisting of a set-screw $e$, tapped down through a lug $e'$ on the frame-plate and adapted to engage the respective pivotal arm of frame E or a bearing-plate $e^2$ on such arm. With this construction the limit of the swing of the frame and movement of the key-levers can be adjusted by turning the screws to raise or lower their arm-engaging ends.

Normally resting upon the respective key-levers to the rear of the cross-bar of frame E are the indicator-rods F F, each carrying on its upper end a tablet or plate F', marked with a figure or number corresponding with the marking or numbering of the finger-piece on the forward end of the respective key-lever. In order to secure the proper guiding and to prevent rotation of these rods, while leaving them free to slide up and down, they are made flat, as shown, and pass through and fit correspondingly-shaped slots $b^2 b^2$ in the plate B'.

The tablets or display-plates F' F' on the indicator-rods are made with parallel vertical sides and pass up through slots $b^3 b^3$ in the upper plate B. These latter slots are situated vertically over slots $b^2 b^2$ in the lower bar, but of course are made longer than such slots, so as to allow the passage of the plates F' F' as the rods are raised and dropped. The ends of the slots are close enough to the vertical sides of the tablets to secure the desired guiding of the tablets and so of the upper ends of the indicator-rods, the tablets being made of such vertical length that during the desired movements of the indicator-rods they cannot pass out of engagement with the slots $b^3 b^3$. If desired, I contemplate setting the guide-plate B farther down, so as to engage and guide with suitable slots the upper portions of the indicator-rods just below the tablets or display-plates.

To insure the proper engagement of each key-lever with its respective indicator-rod, even if from wear or for any other reason the key-lever should have some play on its pivot-shaft, so that its rear end could move to one side or the other of its proper position, I prefer to provide each indicator-rod with an inverted-V-shaped notch $f$ and to make the rod-engaging portion of each key-lever wedge-shaped with a central edge, as shown at $d$. With the indicator-rods guided vertically, as already described, the notches $f f$, engaging the edges on the key-levers, will tend to keep the rear ends of the levers centrally below the rod ends in position to properly raise the rods when the levers are moved to make the desired indications.

In order to lock and hold elevated any indicator-rod or any number of the rods which may be raised at the same time during use of my apparatus, I provide the horizontal transversely-reciprocating plate G, situated above plate B' and between it and the upper guide-plate B. This locking-plate is provided with the slots $g g$, through each of which passes one of the indicator-rods F, these slots being of such length as to allow a short reciprocation of the plate.

For supporting and guiding the plate in its reciprocations I provide the frame-plates A A with horizontal inwardly-projecting lugs $a^3 a^3$ and make the plate with the downwardly-projecting flanges $g^9 g^9$ to engage the sides of these lugs. The ends of the plates are held down upon the lugs by the screws $g^2 g^2$, passing through slots $g^3 g^3$ in the plate.

A spring G', attached to one of the frame-plates A and bearing against a lug on or a portion of the plate G, serves to hold the plate normally slid over toward one side of the apparatus, so that the ends of the slots $g g$ toward the spring are close to the sides of their respective indicator-rods. Upon that side of each rod is a lug $f'$, inclined on its upper and abrupt on its lower side and so situated that when the rod is down in its normal position it stands below the locking or pawl plate G. When the rod is raised by the movement of its respective key-lever, the upper inclined side of the lug engaging the end of the slot $g$ forces the plate G over against the stress of the spring. When the lug passes above the plate, the latter is thrown back again by the spring, so as to bring the portion of the plate at the end of the slot under the abrupt lower side of the lug. When the key-lever is released and allowed to fall, the rod will then be prevented from falling by the engagement of the plate and lug. I prefer to so arrange the lug with reference to the amount of motion of the rod that it will pass a short distance above the locking-plate before the upper limit of the motion of the key-lever and rod is reached. This will insure the proper clearing of the locking-plate by the lug, so as to leave the plate free to be reciprocated into locking position by the spring G'. Obviously, if any number of key-levers be moved at a time to simultaneously raise their indicator-rods they will all be locked in elevated position by the plate G in the same way as the single one just described.

To insure the releasing of any previously-raised indicator-rod when a new indicator is being made, I provide the following means whereby the rising of the frame E, which must take place when any key-lever is operated, will cause a movement of the locking-bar over toward its actuating-spring G', so as to disengage the plate from the lug on the rod already raised.

Figure 5:
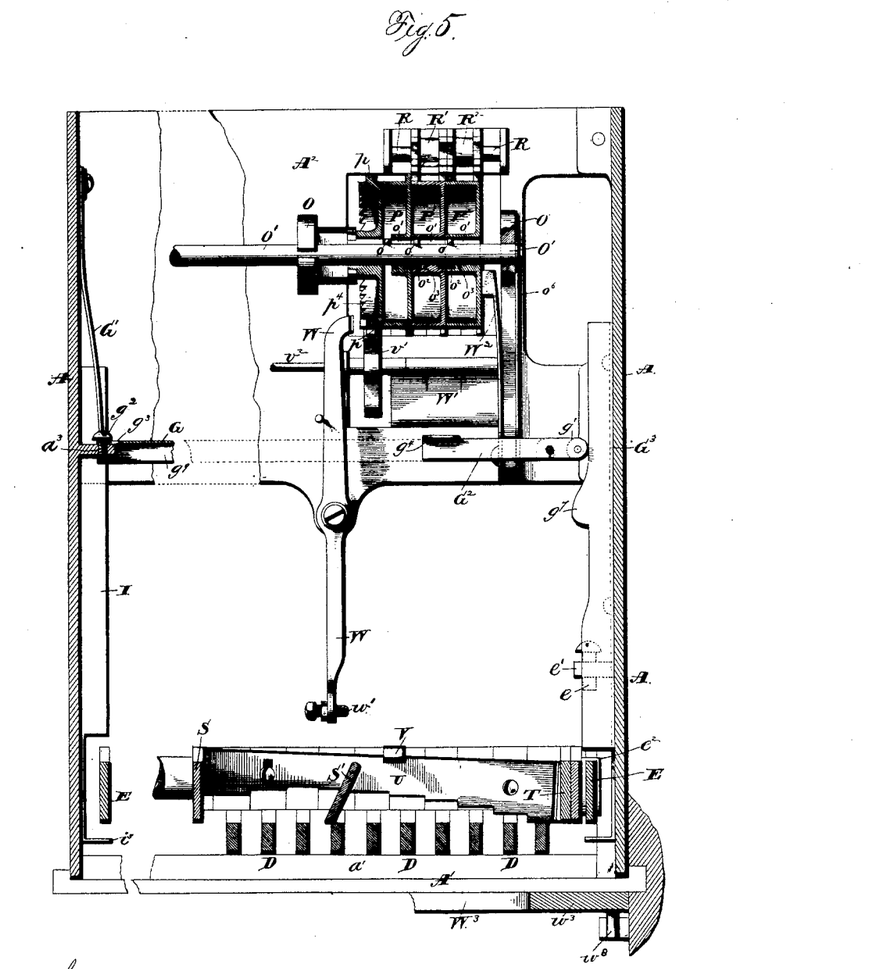
Fig. 5, a view of a transverse vertical section of a portion of the machine on line $y\,y$ of Fig. 3.
Figure 6:
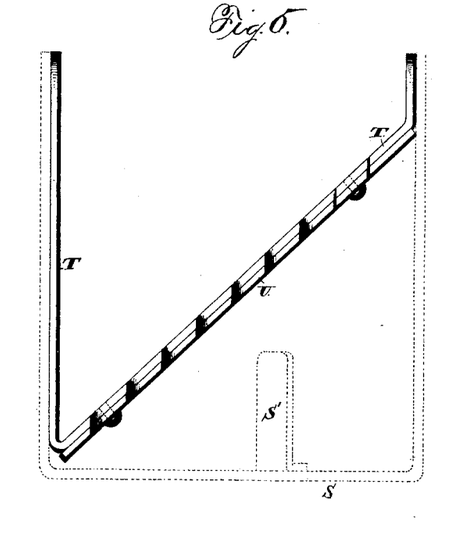
Fig. 6, a detail bottom plan view of one of the diagonal barred frames to be engaged by the key-levers of the apparatus.
Figure 7:
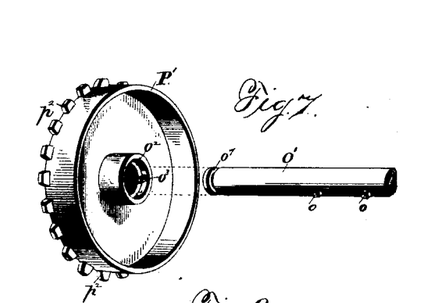
Fig. 7, a detail perspective view showing the means for setting the register-wheels.
Figures 11, 12:
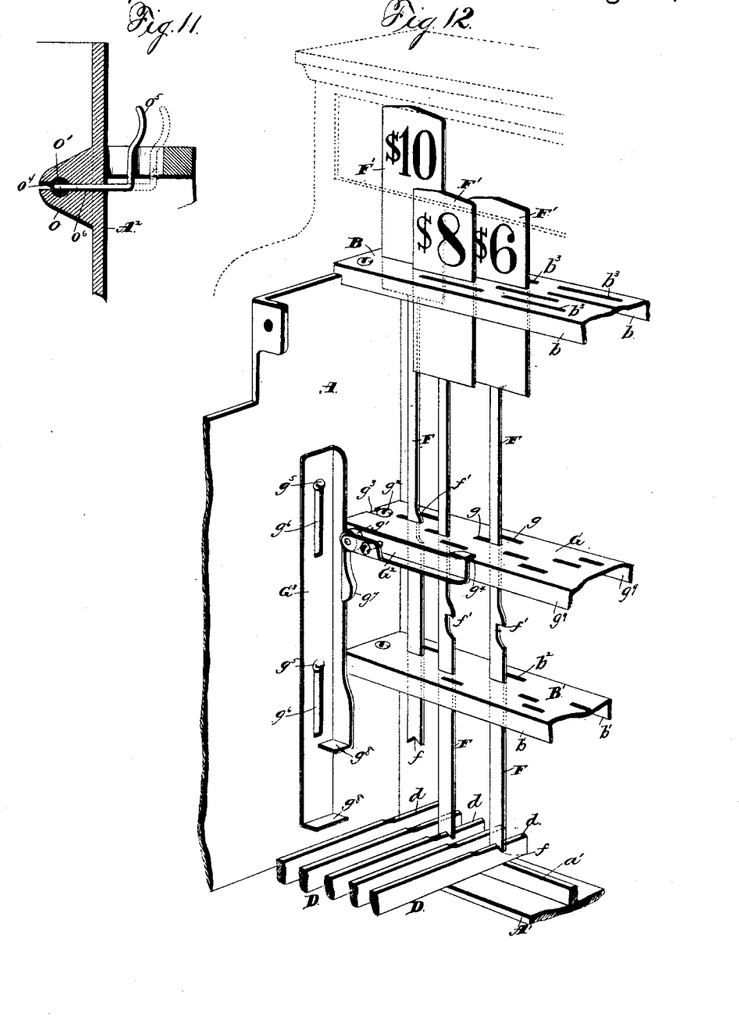
Fig. 11, a detail view showing the means for locking the register-wheel shaft in position to leave the wheels free to turn.
Fig. 12, a detail perspective view showing the operation of locking bar or plate for locking the indicator-rods in raised position.
Figure 15:
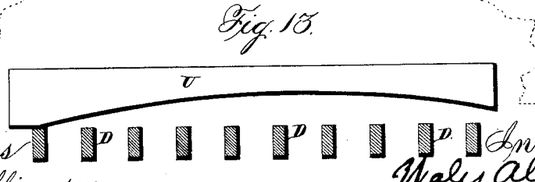

Pivoted to the side of plate G, near the end opposite to that engaged by spring G, is the lever-like piece $G^2$, carrying on its short outer arm a roller $g'$, and on its other arm a lug $g^4$, adapted to project over and engage the top of plate G, as shown, so as to limit the downward swing of such arm when the roller-bearing arm projects horizontally, or nearly so, with its roller toward the nearest frame-plate A. (See Figs 5 and 12.) On the inner side of such plate A is the vertically-sliding plate or bar $G^3$, held in place and guided in its movements by means of screws or pins $g^5$ $g^5$ on the frame-plate A engaging slots $g^6$ $g^6$ in the bar. Such bar or plate slides close to the side of plate G and is provided with the inwardly-projecting tripping-lug $g^7$ in position to engage the roller $g'$ as the bar is reciprocated. On its upper side this lug is inclined downward and inward, so as to cam or force the roller inward as the bar $G^3$ is raised. As the rising of the bar and lug cannot cause the roller-bearing arm of piece $G^2$ to rise, for the lug on its other arm prevents this, both roller $g'$ and the plate G will be forced over toward and against the stress of spring G'. Such movement of plate G causes, as hereinbefore set forth, any raised indicator-rod to be dropped. As the tripping-bar $G^3$ descends again and the lug engages the roller $g'$ on its upper side, the roller-bearing arm of the piece $G^2$ swings down and the locking or pawl plate G is not moved. When the lug $g^7$ passes down off of roller $g'$, the piece $G^2$, which is in effect a swinging pawl, swings down to its normal position again under the influence of the weight of its longer arm. If desired, I contemplate, instead of relying upon the weight of the longer arm of this pawl-piece to return it to operative position, providing a spring for that purpose.

At its lower end the sliding or tripping plate $G^3$ is provided with two arms or lugs $g^8$ $g^8$ to be respectively engaged by the upper and lower sides of the pivotal arm of frame E, as shown in the drawings, so that when the frame rises and falls the plate will be moved up and down. The tripping-lug $g^7$ on plate $G^3$ is so situated on the plate as to engage the roller on the swinging pawl-piece $G^2$ and pass entirely above the same, so as to release the locking-plate G just before the limit of the upward movement of the swinging frame E is reached. If, then, the finger-piece end of a key-lever be depressed to raise the other end of the lever as far as the frame E will allow, it will be certain that any previously-raised indicator-rod will be released and dropped and that the rod raised by the key just actuated will be duly locked in elevated position, so as to display the indicating-mark on its tablet.

At the side of the apparatus opposite to the locking-bar-tripping devices just described is the alarm mechanism adapted to strike an alarm on bell H when an indication is being made.

On the inner side of plate A is a vertically-sliding bar I, which, like the tripping-bar $G^3$ already described, is held in place and guided in its reciprocations by pins or screws $i$ $i$, passing through slots $i'$ $i'$ in the bar into the frame-plate. The lower portion of the bar has two inwardly-projecting lugs $i^2$ $i^3$, respectively above and below the adjoining pivotal arm or frame E. The upper lug $i^2$ is situated some distance above the upper edge of said arm, in order that a key-lever and the frame E can have some upward movement before the lug is engaged by the arm and the bar is raised. (See Fig. 3.)

Pivoted on the inwardly-projecting pivot-pin K on bar I is the pawl K', whose forwardly-extending end is beveled on its under side, as shown. Its rear end is provided with a shoulder $k$, which by engagement with a rib or flange $i^4$ on bar I serves to prevent the pawl from swinging, so as to drop its forward end below its proper position. The upper corner of the rear portion of the pawl is rounded, as shown, to allow the pawl to be swung upward on its pivot.

In the track of the forward end of the pawl as the bar I is slid upward is an arm of the bell-hammer lever L, whose other arm is provided with a suitable hammer or striker L' to strike the bell H. A spring $L^2$ serves to draw the rear end of the hammer-lever downward, so as to cause the hammer to strike the bell when such end of the lever has been raised and released. With this construction when the bar I is raised by the rising of frame E the pawl K engages and lifts the rear end of the bell-hammer lever against the stress of spring $L^2$ and then passes off of such end, allowing the lever to be quickly swung by the spring, so as to strike the bell with the hammer. During the descent of the bar I the pawl K, when it engages with its incline the hammer-lever end, swings upward and then drops back into its horizontal position again when below the lever. The pawl is so situated that the alarm will not be struck until just as the swinging frame E and the key-lever raising such frame reach the extreme limit of their upward movement. By this time the locking-plate will have been actuated through the mechanism operated by the frame E, as already described hereinbefore, to cause it to release any previously-raised indicator-rod, and will have moved back into position to engage the lug or lugs on and lock the rod or rods now raised. In other words, the alarm is only sounded after a full indication is made and when the indicator-rod-locking mechanism is in position to do its work in connection with the newly-raised rod or rods. As the locking mechanism is tripped and the alarm-striking devices are operated by the same frame E, which is moved alike and to the same extent by any or all of the key-levers, it follows that such mechanism and devices will always be operated at the right relative times, and this whether one or more of the key-levers are operated at a time.

It is my intention to number or mark the necessary figures on both sides of the display plates or tablets F F, so that any sums indicated can be seen through display-openings from the front or rear of the machine.

For supporting the rear ends of the key-levers on a line with each other when they are down I prefer to use the rib $a'$ on the rear frame-bar $A'$, as shown in the drawings; but any other cross bar or support for this purpose can be employed.

In connection with my key-levers I have certain check-issuing devices adapted, as a lever is operated, to indicate a certain amount, to issue or feed out into position where it can be taken a check marked with the same amount as the finger-piece of the key-lever and the tablet on the indicator-rod for that key-lever.

Attached to and extending up from the hub of each key-lever is the arm M, whose upper end is forked, as shown, (see Figs. 1, 3, and 9,) to receive the pawl $M'$, pivoted in the fork by means of pin $m$. Each pawl is weighted, so as to stand normally with one arm projecting upward and a little forward from the arm M on the key-lever hub. The weighted tail of the pawl then rests against the rear side of said arm M. The upper end or nose of the pawl is on its upper side provided with a shoulder $m'$ of a depth equal or nearly equal to the thickness of one of the checks to be used. From the lower edge of this shoulder, whose abrupt side is toward the front of the machine, the upper edge of the nose of the pawl is preferably rounded or inclined slightly downward, so as to insure that the shoulder shall be on the highest projecting part of the pawl and that a check cannot be engaged by any portion of the pawl in front of the shoulder.

Extending across the front of the machine above the pivot-shaft C of the key-levers is the check case or holder N, consisting of a series of separate check tubes or compartments $N' N'$, one above each feed-pawl-carrying arm M. Such case or holder is attached to a transverse board or piece O, extending across the front of the apparatus-frame, and is preferably arranged, as shown, in a forwardly and downwardly inclined position, but can be put upright, if desired.

Figure 8:
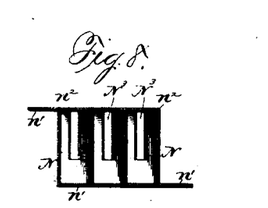
Fig. 8, a detail horizontal sectional view of a portion of the check-holder.

In order to economize space and enable me to get the requisite number of receptacles in place without necessitating the making of the checks quite small, I incline the bottom of each check tube or compartment from side to side at quite an angle. This makes it possible for me to put checks three-quarters of an inch wide in a half-inch tube or compartment, for the checks as put in place within one of the tubes will then rest one upon the other in an inclined position, as indicated in Fig. 8, each check having the same inclination as the bottom of the check tube or compartment. The issue-slots $N^2 N^2$ have, also, the inclination of the tube-bottom and are of just sufficient size to let only the bottom ones of the piles of checks be pushed out through them.

In the bottom of each tube or compartment is the slot $N^3$ for the passage of the nose of the respective feed-pawl $M'$, the lower edge of the rear wall of the tube being also cut away for the same purpose and to allow the shoulder $m'$ on the pawl-nose to engage properly the rear edge of the bottom check.

Figure 9:
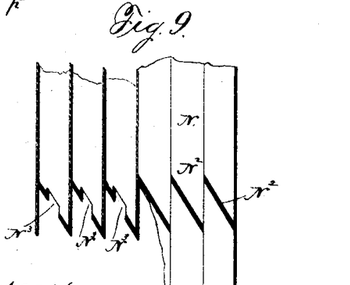
Fig. 9, a detail view, in front elevation and partly in section, of a portion of the check-holder, consisting of several of the check tubes or boxes.
Figure 10:
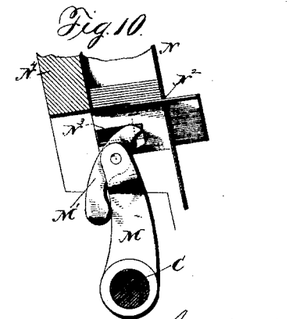
Fig. 10, a detail view, partly in side elevation and partly in section, showing the operation of the check-issuing devices.

Instead of feeding or throwing the checks out clear of the issue-slots $N^2 N^2$, I prefer to have them moved by the feed-pawls only part way out, as shown in Fig. 9, into position, where they can be taken, when desired, by the fingers of the one operating the apparatus.

The check feeding or delivering pawls stand normally just to the rear of the lower ends of the check-tubes, and the arms M, upon which they are pivoted, are of such length as to give the pawls sufficient motion to move the checks part way out, as described, when the key-levers are given their full motions to raise their respective indicator-rods. If for any reason a check fed forward by one of the pawls is not wanted, it can be left until wanted. The other checks in the tube pressing upon it will hold it as left by the pawl. If, before the check is wanted, the same pawl should be moved again by the operation of its respective key-lever to indicate an amount of cash taken in, the check will not be moved or thrown out of its tube, for the pawl cannot move it any farther by direct engagement with it, nor can the pawl reach and engage the next check, for that will be supported above the reach of the shoulder on the pawl-nose by the partly-delivered check.

Figure 1:
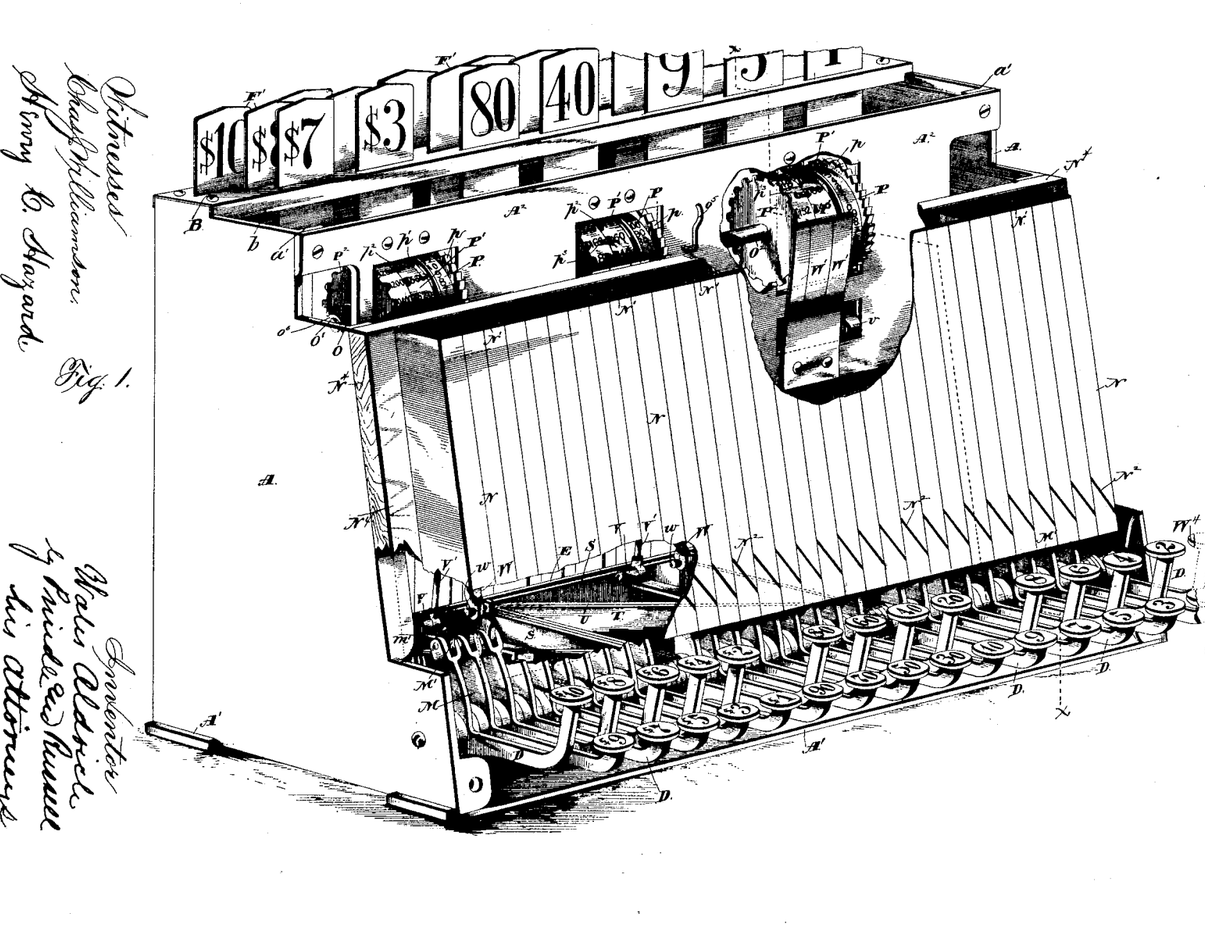
Figure 1 shows a perspective view of my apparatus with the casing removed and portions of the mechanism broken away to show the construction more clearly.
Figure 2:
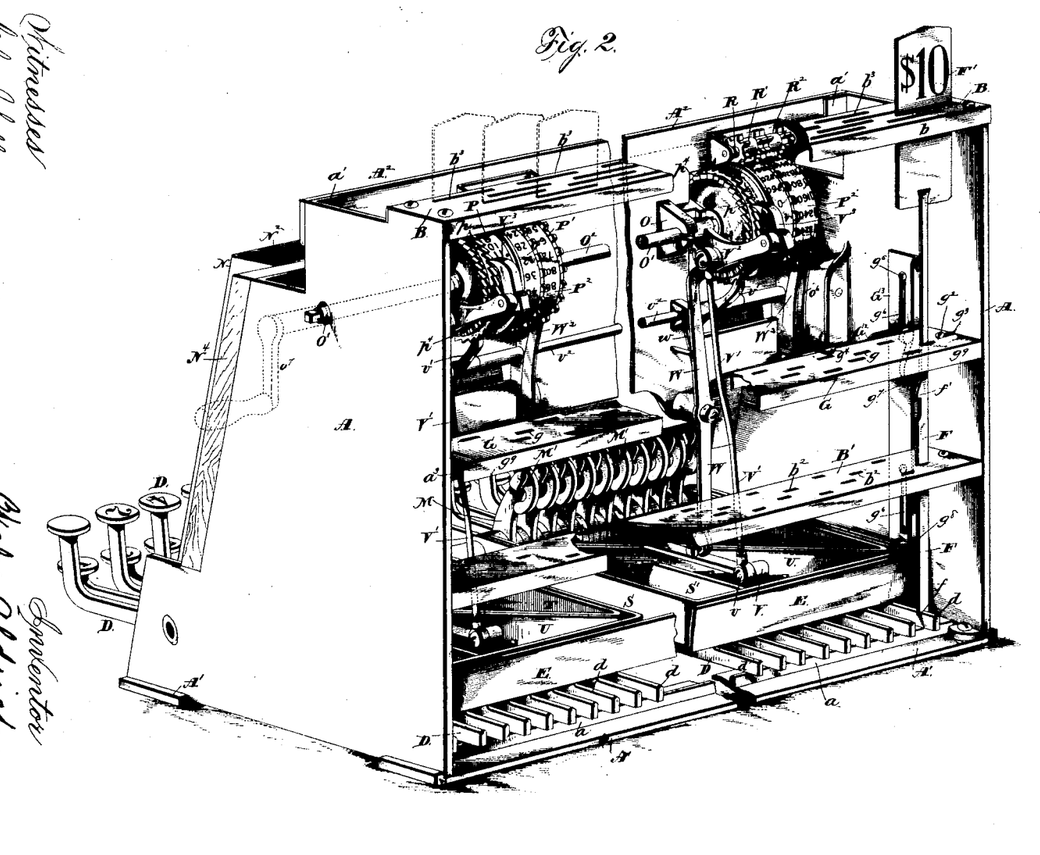
Fig. 2, a similar view looking at the rear of the apparatus.
Figure 3:
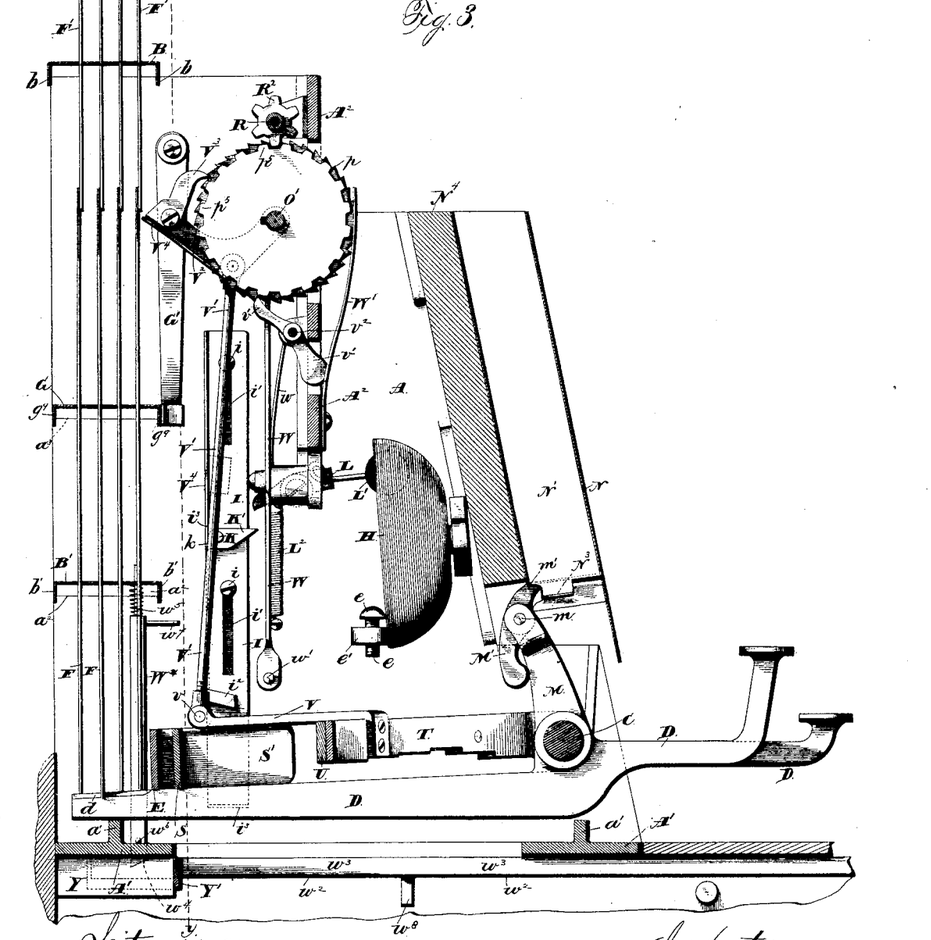
Fig. 3, a view of a vertical section of the apparatus on line $x\,x$ of Fig. 1.
Figure 4:
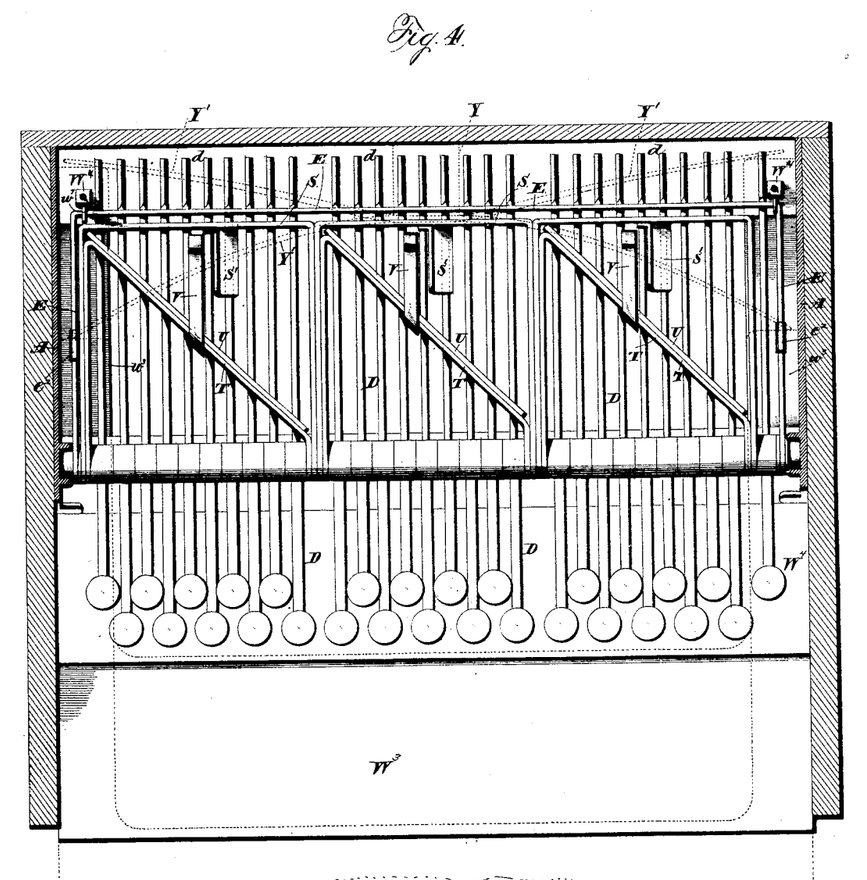
Fig. 4, a plan view showing the relative arrangement of the series of keys, the several swinging frames therefor, and the mechanism for locking and unlocking the till-lid.

The check-holding case is preferably given a slight upward and rearward inclination with reference to the apparatus frame, as shown in Figs. 1 and 3. This gives a neat and compact form to the apparatus and also aids to prevent any accidental dropping or falling of any check projected partially from its tube by its feed-pawl, as described hereinbefore.

The check-tubes and checks are preferably made rectangular in shape; but I do not limit myself to such construction. A convenient way to make the tubes and construct the whole case is indicated in Fig. 8. A strip of sheet metal is bent twice at right angles, the bends being in opposite directions. The main or central portion $n$ is of a width equal to that of a side of one of the desired tubes, while the portions $n' n'$, bent at right angles to the main portion, are of the width of the front and rear sides of the tube. The check-case can then be built up of these bent strips by soldering or otherwise fastening the outer edge of that portion $n'$ of one plate which is to form the back of one tube to the angle or bend $n^2$ at the rear edge of the main portion of the next strip. The outer edge of that portion of the strip which is to form the front of the tube is then similarly fastened to the angle at the front edge of the main portion of the next adjoining bent plate. With this method of construction a light and strong check-case, with the requisite check tubes or compartments, can be easily and cheaply made.

The inclined bottoms of the check-tubes can be made and fastened in place in any desired way.

In connection with my indicating and check-issuing mechanism I provide registering devices for registering the amounts indicated by the apparatus at various times. Supported in suitable bearings $O'$ $O'$ on the rear side of plate $A^2$ is the shaft $O^2$, upon which are journaled the three sets or series of register-wheels, one series being above and for the cent series of key-levers, the next for the middle or ten-cent series, and the third for the dollar series of such levers. The first or right-hand wheel P of each series is provided with a series of forty ratchet-teeth $p$ $p$, and at $p'$ is provided with the single tooth projecting a short distance over the periphery of the next wheel $P'$. This latter wheel has around its edge farthest from wheel P a series of twenty teeth $p^2$ and is also provided with a single tooth $p^3$, like that on wheel P, projecting over the next wheel $P^2$. I have shown only three wheels in each series; but it will be understood that the number of such wheels can be increased indefinitely, as desired.

To carry the amounts registered from one wheel to another in the series on a shaft R, held in suitable bearings on plate $A^2$, are the double pinions $R'$ $R^2$, each consisting of two pinions rigidly connected together. One of the connected pinions of double pinion $R'$ is in such position that each time register-wheel P makes one full rotation the tooth $p'$ meshes with the pinion and turns it the distance of one tooth. The other pinion forming part of this double pinion meshes directly with the teeth $p^2$ $p^2$ on the register-wheel $P'$, so as to turn such wheel one tooth every time the wheel P makes a complete revolution. The wheel $P^2$ is in the same way, through the medium of the double pinion $R^2$, turned one tooth each time the register-wheel $P'$ makes a complete rotation.

On the periphery of the first wheel P of the cent series there are forty numbers or figures from "0" to "39," inclusive. On the next wheel $P'$ there are twenty numbers. These numbers run "40," "80," "120," and so on, successively increasing by forty up to "$7.60," next to which number comes a "0." On the next wheel $P^2$ the numbers are twenty in number, and beginning with "$8" they run "$8," "$16," "$24," and so on up to "$152," next which comes the 0 mark. On the first wheel of the second or middle series there are forty numbers, the first being "0," the next "$10," the next "$20," and so on, up to "$390." The second wheel has twenty numbers, the first being "0," and the remaining nineteen running from "$4" to "$76," each successive number being greater than the preceding by four dollars. The third wheel has also twenty numbers, one being "0," and the remaining nineteen running "$80," "$160," and so on, increasing successively by eighty dollars up to "$1,520." In the third series of wheels the first wheel has forty numbers, running "0," "$1," "$2," "$3," and so on, up to "$39." The next wheel has twenty numbers, running "0," "$40," "$80," "$120," and so on, up to "$760," while the third wheel has its twenty numbers running "0," "$800," "$1,600," "$2,400," and so on, up to "$15,200."

I do not limit myself to the special arrangement of the numbering on the wheels of the different series, but prefer it as described.

Extending across and resting upon the rear portions of each series of key-levers is a separate swinging frame S, like the large frame E already described, but only engaging the levers of one series. The pivotal arms of each of such frames S are pivoted to the key-lever shaft C at points beyond the opposite ends of the respective series of key-levers, as shown in the drawings; also, pivoted to the shaft at the opposite ends of each series of key-levers is a second small frame T, whose pivotal arms are journaled on the shaft C at points between the corresponding arms of the respective frame S and the ends of the key-lever series. The cross-bar of each frame T, instead of running across the key-levers at right angles thereto, extends diagonally over them from the rear to the front, as shown in the drawings. The outer or farther end of this bar is situated over that key-lever of the respective series which is to indicate the largest amount, while its inner or forward end, where it comes nearest to the pivot-shaft, is over the key-lever which is to cause indication of the smallest amount. With this arrangement, if the diagonal bar were normally supported at a short distance above the key-levers and its lower edge were in a plane parallel with that of the tops of the keys the frame would be swung up a certain distance by the raising of the key-lever which is below the outer end of the bar, a less distance by the same amount of movement of the next key, and so on, the frame being moved least by the movement of the lever above which is the inner or forward end of the diagonal bar. I have found, however, that the difference between the amount of swing of the frame T caused by the raising of one lever its full distance and that caused by the full swing of the next lever will, when the lower or bearing edge of the diagonal bar is arranged, as described, in a straight line parallel with the tops of the keys, vary at different points along the series of key-levers.

In order to make the difference in the movements of the frame as actuated by the different key-levers a constant one, so that the registering devices could be properly operated by suitable connections from the frame, I provide the latter with the lever-engaging surface or edge formed and relatively arranged as shown in the drawings. Such surface is, on the lower edge of the bearing piece or plate U, adjustably attached to the diagonal bar by the pivot pin or screw $u$, near one end of the plate, and the slot $u'$ and screw $u^2$ near its other end. The bearing-surface can, however, if desired, be formed directly on the diagonal bar itself.

I shall first describe the arrangement of the bearing-surface carried by the diagonal bar for the series of ten key-levers at the left-hand side of the machine. Starting at the outer and farther end of the bar the bearing-piece rests directly upon the highest-numbered lever of the series, so that as the lever is raised the frame T will have the full movement of the lever. If the bearing-surface on or carried by the diagonal bar were to rest upon the next lever also, the frame T would obviously be moved the same distance by the rising of such lever as it would by the movement of the first one just described, as the frame is pivoted on the same shaft with the key-levers. In order that the second key-lever may move the frame a less distance than the first lever, it is therefore necessary to have the surface on the frame-bar to be engaged by the lever a certain distance above the upper side of the lever. Where there are, as described, ten key-levers, each succeeding lever should move the frame one-tenth of its whole possible swing less than the distance through which the next preceding lever would move it. This equal difference in the movements of the frame by the different key-levers cannot be secured by making the bearing edge or surface on the diagonal bar an inclined one, rising from left to right across the entire series of key-levers, for the arcs of possible travel of those portions of the successive levers which are to engage the bearing-surface vary, decreasing in length from the left to the right of the series.

In order to secure for each lever a movement of the frame equal to the proper number of tenths of the whole possible swing of the frame—that is, for one lever ten-tenths, or the whole of the movement, for the next nine-tenths, for the next eight-tenths, and so on—I find the following arrangement of the bearing surface or surfaces on the diagonal bar requisite: The outer end of the diagonally-arranged bearing-plate is situated, as described, over the end of the lever at the left of the series. From this point the plate runs diagonally across the lever series until it reaches a point above a part of the end lever which is distant from the lever-pivot one-tenth, as far as is the surface-engaging part of the lever at the other end of the series from that lever's pivot. With this arrangement and with the bearing-surface of the diagonal bar at its outer end resting on the lever at the left of the key-lever series I place the part of the bearing-surface to be engaged by the second lever at a height above the lever equal to one-tenth of the entire possible upward movement of the surface-engaging point on the lever. The part of the bearing-surface to be engaged by the third lever is then placed at a height above such lever equal to two-tenths of the possible movement of the surface-engaging point on that lever. This arrangement is carried on throughout the series of levers, each successive lever-engaging surface or part of the whole surface being above its respective lever by a greater number of tenths of the whole swing of the engaging part of that lever until the inner end of the diagonal bar is reached, where the bearing-surface is above the end lever of the series a distance equal to nine-tenths of the full movement of the engaging part of that lever. This construction and arrangement secures the desired regular difference in the movements of the frame T by the different levers. The full movement of the key-lever marked "$10" in the drawings will then cause the frame to swing a certain distance, the "$9" key-lever will swing it nine-tenths as far as the "$10" lever, the "$8" lever eight-tenths as far, and so on to the "$1" lever, which only swings it one-tenth as far as the "$10" lever.

As shown in the drawings, the lower side or edge of the bearing-piece can be cut in steps, each step having or containing the part of the bearing-surface for one of the levers, or it can, as shown in Fig. 13, be cut on a curve passing through the different points on the surface to be engaged by the different levers. Where there are only nine instead of ten levers, each successive lever is to move the frame T for the lever series one-ninth of its whole possible swing less than the preceding lever. Each succeeding bearing surface or point on the bearing-surface to be engaged by a key-lever is therefore placed above its respective lever a greater number of ninths of the possible upward movement of the surface-engaging point on such lever.

I have found that by running the key-lever-engaging piece constructed and arranged on the register-actuating frame, as described, diagonally across the series of key-levers, so that it comes nearer and nearer to the pivot-shaft C as the key-lever for registering the lowest amount is approached, I am enabled to secure the desired and necessary proportional movement of the frame by the different key-levers without danger of the overthrow or overregistration, which is liable to take place where a frame with an inclined bar running across the keys in a plane at right angles thereto is used. With the latter construction the lower keys have to travel a considerable distance before striking the frame-bar, the result being that when they do strike it they give it a quick sudden blow which is liable to throw it up beyond the point to which it should be raised. With my construction, on the other hand, the key-lever-engaging piece resting upon the key-lever for the highest registration is, as it runs over the lower keys, brought closer to the pivotal points of the latter, so as to be in position to be engaged by parts of such keys, which move slowly and through but short distances, and consequently are not likely to strike the piece on the bar with a sudden and violent shock to cause overthrow and consequent too great registration. The frame can then be used to actuate suitable registering mechanism to register different amounts, according to the different movements given the frame by the different key-levers.

Attached to each frame T is an arm V, whose outer or rear end is in line with the outer end of the diagonal bar of the swinging frame, and connected with this arm by a suitable pivot-pin $v$ is the rod $v'$, whose upper end is pivotally connected with the arm $V^2$, swinging on shaft $O^2$. This latter arm, attached to a pawl-lever, carries pivoted on its outer end a pawl $V^3$, held by spring $V^4$ in engagement with the ratchet-teeth $p\ p$ on the first register-wheel of one of the series of register-wheels described hereinbefore. As a key-lever is moved to raise the frame T the pawl-lever $V^2$ will then be swung to turn the register-wheel a certain distance, according to the movement of frame T, and when the key-lever is released the frame will drop again and the pawl-lever will swing down to its normal position, its pawl riding over the ratchet-teeth $p\ p$.

To prevent retrograde rotation of the register-wheels P P P of the different series, I provide the weighted pawls $v'\ v'\ v'$, pivoted on a shaft $v^2$, supported on plate $A^2$. The nose of each of these pawls engages the ratchet-teeth $p\ p$ on one of the wheels P.

To prevent a register-wheel from being turned too far by a quick movement of a key-lever, I provide brake mechanism adapted to be applied at each registering operation. On the side of each of the wheels P of the different sets of registering-wheels is a series of ratchet-teeth $p^4\ p^4$. Pivoted upon a suitable pivot-pin on plate $A^2$ is a brake-lever W, one for each wheel P. It is pivoted to swing toward and from the side of the wheel, and its upper end is so formed as to be adapted to engage the crown ratchet-teeth $p^4\ p^4$ when it is swung toward the wheel side. On each of the frames S S S is an inclined arm S', adapted to engage the lower end of one of the brake-levers or a bearing on such end whenever the frame is raised by the movement of one of the series of key-levers upon which the frame rests and force such end of the brake-lever over to bring the upper end of the same into engagement with the ratchet-teeth $p^4\ p^4$ on the register-wheel. As each frame rests upon the same key-levers as one of the frames T, it follows then that at every registering operation the brake will be applied to prevent overregistration. A spring $w$, attached to each brake-lever and engaging a suitable abutment or bearing on plate $A^2$, serves to hold the nose end of the lever normally away from the teeth $p^4\ p^4$ on the register-wheel. It is intended that the nose of the brake-lever shall not engage the ratchet-teeth on the register-wheel until just at the end of the rotation of the wheel by the pawl $V^3$.

In order to provide for adjustment of the motion of the brake-lever, its lower end has a set-screw $w'$, whose inner end is adapted to engage or be engaged by the inclined arm on the frame. Bearing against the teeth $p^2$ on the two wheels $P'\ P^2$ of each series and on the wheel P are plate or leaf springs $W'\ W'\ W'$, also serving as brakes to prevent accidental movement of the wheels. Against the outer side of each wheel $P^2$ is a spring-arm $W^2$, which serves to hold the wheels of each series closely against each other in the shaft.

For setting the register-wheels of the different series back to zero I make the shaft $O'$ longitudinally movable as well as rotatable in its bearings O O on plate $A^2$ and provide it with the pins or lugs $o\ o$, one for each register-wheel. The hub and bearing portion of each wheel is provided within with a longitudinal groove or keyway $o'$ for allowing the longitudinal passage of the shaft through the series of wheels when the registering mechanism is being assembled. The hub of each wheel is also, as shown, cut away or recessed at $o^2$ around the shaft, so as to leave room for the movement of the respective lug $o$ on shaft $O'$ as the latter is revolved. This annular recess is made deeper or to extend along the hub farther than the width of the lug $o$, so that the shaft can be moved a certain distance longitudinally without moving the lug beyond the recess.

On the wheel-hub at the inner side or end of the recess $o^2$ is a smaller lug or pin $o^3$ to be engaged by one of the lugs $o$ on shaft $O'$ when said shaft has been moved longitudinally to bring the shaft-lug into the same plane with the wheel-lug and is rotated.

To lock the shaft moved longitudinally, so that its lugs $o\ o$ shall be out of the track of the lugs or pins $o^3\ o^3$ on the wheel-hubs, I provide the shaft with an opening $o^4$ to be engaged by a pin $o^5$, passing through an opening $o^6$ in the plate $A^2$. The opening in the shaft is so situated as to come opposite the opening in the plate and the pin $o^5$ when the shaft is in such longitudinal position as to insure the clearing of the wheel-lugs by its pins or lugs $o\ o$. A spring $o^6$ on plate $A^2$ engages a groove $o^7$ in the shaft and tends to throw the shaft longitudinally into such position that its lugs can engage the wheel lugs or pins. With this construction then the shaft is by pin $o^5$ normally locked, so that the wheels are free to revolve without contact of the shaft and wheel-lugs; but immediately upon the unlocking of the shaft the latter is thrown at once in position, so that when it is turned its lugs will engage the wheel-lugs and cause the wheels to rotate together. The wheel-lugs are all similarly situated with reference to the zero or starting points of the numbers on the wheels, so that by means of the shaft as shifted into setting position all the wheels can be rotated or set back to "zero," as desired. The end of the shaft is preferably made to project beyond the frame-plate A and provided with a crank $o^7$ or wheel for turning it.

I contemplate, where it is desired to adjust the length of the connecting-rods V′ between the arms V on frames T and the pawl-lever $V^3$, dividing each of such rods and, as indicated at $V^4$ in Fig. 3, connecting the two portions of the rod by a screw-coupling of the ordinary and well-known construction.

With the ends of the rods screw-threaded, as shown in full lines in the drawings, the distance between the pawl-lever $V^2$ and the arm V can obviously be adjusted to a certain extent by turning the rod to screw its ends farther into or out of the rod end sockets in the pivot-pin-receiving pieces $v^2$ $v^2$.

If a friction-brake mechanism for the register-wheels is desired instead of the pawl-and-ratchet form shown and described hereinbefore, the lever W can be provided with a friction-shoe to engage a plane or smooth surface or rim on the side of the wheel P where the ratchet-teeth are shown. With the intermittingly-acting brake-actuating devices already described this friction-shoe will then be pressed against the wheel with the greatest pressure just as the upward throw of a key-lever is finished.

In connection with my mechanism, as set forth and described hereinbefore, I intend to use a till-drawer and sliding cover arranged and operating like that shown and described in my United States Patent, No. 380,542. This cover $W^3$ is so constructed that when it is locked it will not only cover the top of the draw, but prevent such draw from being pulled out. At its sides it slides in grooves or ways $w^2$ $w^2$ in the casing sides.

In each of the arms $w^3$ $w^3$, projecting rearward and inward from the body of the lid or cover, is provided a ratchet-shaped locking-notch $w^4$ to be engaged by the lower end of a sliding bolt $W^2$. Each of these bolts has its lower end beveled on its forward side, so as to be easily cammed upward as the till-cover is pushed inward, projecting down through a guide-opening in the frame-bar A′. The upper end of the bolt, preferably reduced in size, as shown, projects up through and is guided by the bar B′. A spring $w^5$, engaging the under side of this bar and a shoulder on the bolt, presses the bolt downward into locking position, while a stop-pin $w^6$, engaging the top of bar A′, serves to limit the fall of the bolt. Near its upper end each bolt is provided with a pin $w^7$, adapted to be engaged by the frame E when such frame has been raised far enough to cause the alarm to be struck, as described hereinbefore. The till lid or cover then when once closed and locked cannot be unlocked without the sounding of an alarm. The frame E, as already set forth, is raised by the movement of any key-lever in making an indication and registration with the apparatus. The lid or cover $W^3$ will then be unlocked each time a key-lever is fully raised by the depression of its finger-piece end; but as it is sometimes desirable, as in making change, to get at the money-drawer or till without registration I provide an extra key-lever $W^4$, which engages the frame E, but is unconnected with any indicator-rod or with the registering devices. This blank key-lever is shown at the right-hand end of the bank of keys.

Instead of using the spring mechanism shown in my said patent for throwing the lid or cover open when it is unlocked, I prefer that shown in the drawings of my present case.

Attached to a lug or block Y on the casing are the two oppositely-extending spring-arms Y′ Y′, each engaging an end of one of the arms $w^3$ $w^3$ on the cover. If desired, these two springs can be joined together or made in one piece attached at its middle point to the block Y.

On the under side of each arm $w^3$ is a lug or block $w^8$, adapted by engagement with a partition in the drawer to limit the outward throw of the lid or cover with reference to the drawer, or the stop lug can, as shown in my patent, be in position to engage the inner side of the drawer front.

The locking of the drawer shut by means of the lid or cover can be secured, as fully set forth in the said patent, by a rib or downwardly-projecting flange $w^9$ on the front edge of the lid, adapted to engage and cover the upper edge of the drawer-front.

The operation of my apparatus is briefly as follows: If it be desired to indicate and register an amount of cash received—as, for instance, sixty cents—the sixty-cent key-lever is actuated by depressing its finger-piece end. The rising of the rear end of the lever causes the frame E and the two smaller frames S and T, engaged by that lever, to rise. The frames E and S, as their cross-bars rest directly on the key-levers, always rise the same distance whichever key-lever may be moved. By the rising of the frame E the indicator-rod locking bar or plate G is caused through the mechanism described to move, so as to release and let drop any previously-raised indicator-rod, the alarm mechanism is caused to operate, and the till-drawer lid is unlocked, so that it is thrown open by the springs to uncover the drawer or till below. As soon as the locking plate or bar G has been moved over to release any previously-raised indicator-rod it is thrown back again by its spring, so as to be in position to engage and lock elevated the indicator-rod just raised by the key-lever. I find that by positively actuating the locking-bar G through connections with the frame E, I secure better and more certain unlocking of previously-raised indicator-rods than if a cam-shoulder on each rod itself were used to move the bar as the rod is raised. As the frame S rises with the key-lever, its arm S' will always engage and operate the brake-lever and cause the brake to be applied to the first register-wheel of respective registering mechanism just at the right time—that is, at the end of the upward swing of the lever—so that the wheel cannot by a quick throw of the lever be rotated too far to register properly. On account of the raised position of the engaging surface or part of the surface on frame T to be engaged by the lever, the latter rises through three-ninths of its possible movement before the frame begins to rise with it. By the continued movement of the key-lever the frame will then be raised with the key six-ninths of the distance through which it would be raised by the ninety-cent key, upon which the bearing-surface on frame T rests when the lever and frame are both down in their normal positions. The six-ninths movement of the frame T will, through the connection-rod and pawl-and-ratchet mechanism described, turn the first register-wheel of the respective series through six numbered divisions. The carrying of the amounts from one register-wheel to another one in the series need not be described further than it has been hereinbefore, as it is done in a well-known way. The swing of the sixty-cent key then causes the sixty-cent indicator-rod to be raised to display its marked plate or tablet, previously-raised indicator-rods to be dropped the amount with which the key and tablet are marked to be registered, an alarm to be sounded, and the till-drawer lid or cover to be unlocked and thrown open. The cash taken in can then be put in the drawer and the lid closed again. The movement of the key, also through the check-feeding devices described, causes a sixty-cent check to be pushed part way out of the check-holder into a position from which it can easily be taken by the fingers. The check can then be taken and deposited in a receptacle provided therefor or can be given to the purchaser to be by him placed in the receptacle. The checks in the receptacle will then serve as an additional guard against dishonesty or tampering with the apparatus, for the aggregate amount represented by the checks must agree with the aggregate amount registered.

The check-delivering attachment, with the registering and indicating mechanism, is also of use where there is a bar connected with an eating-saloon. The cash for sales at both bar and restaurant can then be given to the one operating the apparatus. He indicates and registers the two amounts separately and takes out the check corresponding to the amount of the table or eating-saloon bill, which check can be deposited in a suitable receptacle provided therefor. Thus the amounts of receipts for bar and table can be kept separate, while the cash is taken in at one place. When an account of the state of the registering devices after a certain amount of use of the apparatus has been taken and it is desired to set the register-wheels back to "zero," the pin $o^5$ is drawn out to release shaft O and the spring $o^6$ throwing the shaft into setting position, the crank $o^7$ or turning-wheel is rotated until all the register-wheels show their "zeros" in line and in the proper position. The shaft is then moved longitudinally against stress of spring $o^6$ and is locked by the insertion of the pin into the hole $o^4$.

I do not claim or intend to cover by my claims in the present application the check-holder by itself, the check-feeding devices, the combination of the holder with the devices used for feeding the checks therefrom, or the combination of the check-feeding devices with the alarm mechanism adapted to give an alarm as a check-feeding device is operated, as such subject-matter and combinations are fully covered by application, Serial No. 302,213, filed by me as a division of this case.

Having thus described my invention, what I claim is—

1. In an indicator, in combination with the series of indicator-rods provided with projections having abrupt locking-shoulders and inclines on the lower and upper ends, respectively, the sliding locking-bar for engaging the shoulders on the rods as the latter are moved into indicating position, a spring tending to keep the bar in position to engage the shoulder on any moved rod, the series of keys for moving the rods, the swinging frame extending across the series of keys, and a tripping device actuated by such frame to trip and release the locking-bar as a rod is being moved by its key and before the projection on such rod reaches the bar, substantially as and for the purpose specified.

2. In combination with the series of indicator-rods provided with locking shoulders, the rod-locking bar provided with portions to engage the shoulders on any indicator-rod moved into indicating position, the spring for moving and holding the bar in locking position, the series of rod-moving levers, the swinging frame engaged by the levers, and the sliding piece engaged and moved by the frame, a cam on such piece, and the swinging pawl-piece on the locking-bar engaged by the cam, substantially as and for the purpose described.

3. In combination with the indicator-rods provided with projections having the abrupt shoulders and inclines, the reciprocating locking-bar provided with slots through which the indicator-rods pass, a spring holding such bar normally in locking position, the keys for moving the indicator-rods, the swinging frame engaged by the keys, and tripping mechanism actuated by the frame to move the locking-bar out of locking position and then let it fly into such position again as the frame is moved by a key bringing an indicator-rod into indicating position before the projection on the rod passes the bar, substantially as and for the purpose shown.

4. In an indicator, in combination with the reciprocating locking-bar for locking the indicator-rods, the spring for holding the bar in locking position, the pivoted piece on the bar, a stop for limiting the upward swing of the outer end of such piece, while allowing it to swing downward, and the sliding bar provided with the cam made inclined on its upper side and abrupt below, substantially as and for the purpose specified.

5. In combination with the reciprocating locking-bar, the spring forcing it in one direction, the pivoted piece on the bar having on one arm a lug to limit its swing and on the other arm a roller, and the movable bar or piece having a cam for engaging the roller, made inclined on one side and abrupt on the other, substantially as and for the purpose set forth.

6. In combination with the series of indicator-rods provided with locking-shoulders, the reciprocating locking-bar for engaging such shoulders, the spring engaging such bar, the pivoted piece on the bar having a stop on one arm to engage the bar and a roller on the other arm, the indicator-rod moving keys, the movable frame engaging such keys, and the sliding bar or plate connected with the frame so as to be moved thereby and provided with a cam-lug to engage the roller of the pivoted piece on the locking-bar, substantially as and for the purpose described.

7. In combination with registering mechanism and a series of devices for actuating such mechanism, each connected therewith so as to cause it to register different amounts, a series of check-feeding devices connected with the register-actuating devices, and a series of check-holders, each containing checks marked to indicate the amount registered by the movement of the register-actuating device connected with the respective feeder for such check-holder, substantially as and for the purpose specified.

8. In combination with a series of register-actuating devices and registering mechanism to register different amounts, connected with the several actuating devices, a check-holder for each register-actuating device, and a check-feeding mechanism connected with each of such devices, so as to be actuated thereby, substantially as and for the purpose shown.

9. In combination with a series of check-holders, each containing checks marked or adapted to indicate a certain amount, a series of feed devices to feed out separately the checks in the different holders, a registering mechanism, and connections between such mechanism and the series of feed devices whereby the registering mechanism is operated to register the amount of each check fed out, substantially as and for the purpose set forth.

10. In combination with a series of check-holders for containing checks, the checks in the holders adapted to indicate certain amounts, registering mechanism, a series of devices for actuating it to register amounts corresponding with the marks or indications of the check in the different holders, and a series of devices, each connected with one of the different register-actuating devices and each adapted to engage and feed from its holder a check to indicate the amount caused to be registered by the respective register-actuating device, substantially as and for the purpose described.

11. In combination with the registering mechanism, the series of levers and connections between the levers, and registering mechanism for causing the latter to register different amounts, a series of check-holders, each containing checks marked to indicate the amount caused to be registered by the movement of one lever, and the series of feed devices, each connected with one of the levers and operating in connection with the respective check-holder of that lever, substantially as and for the purpose specified.

12. In combination with a check-holder containing checks, each marked with or adapted to indicate a certain amount, a key-lever, the check-feeding device operated thereby, and registering mechanism for registering the amounts indicated by the checks connected with the lever, so that each time the latter is moved to issue a check the amount indicated by that check will be added up by the register, substantially as and for the purpose shown.

13. In combination with a series of keys, registering mechanism connected with the several keys, so as to register different amounts as the different keys are operated, a series of check-holders for containing checks adapted to indicate amounts corresponding with the different amounts registered, and the series of feed devices, each connected with a key, so as to be caused thereby to engage a check in the holder corresponding with that key, substantially as and for the purpose set forth.

14. In an indicating apparatus provided with a series of movable indicators, in combination with each indicating device, a check-holder, and a check issuing or feeding device connected with the indicating device, so as to be operated therewith, substantially as and for the purpose described.

15. In an indicating apparatus, in combination with the indicating mechanism for indicating different amounts, a series of check-holders containing checks marked with the different amounts to be indicated and means for feeding from such holders as different indications are made the checks corresponding with such indications, substantially as and for the purpose specified.

16. In an indicating apparatus, in combination with a series of check-holders and feed devices for issuing checks therefrom, the series of movable indicating devices and connections between the check feeding and indicating devices, adapted to cause a check-feeder to be operated each time that an indication is made, substantially as and for the purpose shown.

17. In an indicating apparatus, in combination with the series of movable indicating devices for indicating different amounts, suitable holders containing checks marked with the amount to be indicated and means adapted to be operated by the movement of any indicating device to feed from its holder a check marked with the amount indicated by such device, substantially as and for the purpose set forth.

18. In an apparatus for indicating, in combination with the series of movable devices for indicating various amounts, a series of check-holders, each containing checks marked to correspond with one of the possible indications of the apparatus, check feeding or delivering devices, one for each holder, each connected with and operated by the movement of the indicating mechanism, which causes the indication of the amount marked on the checks in the respective holder, substantially as and for the purpose described.

19. In combination with the series of indicator-rods provided with display plates or tablets marked with certain amounts, the series of keys for moving such rods, the series of check-holders, each containing checks marked with the same amount as one of the indicator-plates, the series of check feeding or issuing devices for the holders, each connected with and operated by the key which moves the indicator-rod marked to correspond with the checks in the respective holder, substantially as and for the purpose specified.

20. In an indicating apparatus, in combination with the series of indicating display devices, the series of key-levers for operating the display devices, a series of check-holders, arms on the key-levers, and check-feeding pawls on such arms, substantially as and for the purpose set forth.

21. In an indicating apparatus, in combination with the series of indicating display devices, a key-lever for operating a display device, a check-holder above the lever, provided with a suitable check-issue slot, an arm on the lever, and a pawl on such arm provided with a check-engaging shoulder, substantially as and for the purpose described.

22. In an indicating apparatus, in combination with the series of indicating display devices, the series of key-levers for operating the display devices, the series of check-holders, each provided with a check-issue slot and with an opening in its bottom to admit a check-feeding device, the arms on the levers, and the check-feeding pawls on such arms, substantially as and for the purpose specified.

23. In a cash registering and indicating apparatus, in combination with the series of indicating devices for indicating various amounts and the registering devices for registering the amounts indicated, a series of check-holders adapted to receive checks marked to correspond with the indications of the apparatus, and check-feeding devices connected with the indicating and registering devices, so as to be operated therewith, substantially as and for the purpose shown.

24. In a cash registering and indicating apparatus, in combination with the series of indicating devices for indicating different amounts and registering mechanism for registering the amounts indicated, the series of check-holders, one for each indicating device, and a check feeding or issuing mechanism for each holder, connected with the respective indicating device, so as to be operated therewith, substantially as and for the purpose set forth.

25. In a cash register and indicator, in combination with the series of key-levers, the swinging frame having the cross-bar extending over the rear portions of the key-levers, a movable plate adapted to be engaged by the frame, a trip carried by the plate, a pivoted lever adapted to be engaged by the trip on the plate, a bell-striker operated by the lever, and a bell, substantially as and for the purpose shown.

26. In a cash register and indicator, in combination with the series of keys, the swinging frame extending across such keys, the sliding piece adapted to be moved by such frame, the swinging pawl on such piece, and the spring-actuating alarm-striking lever in position to be engaged and moved by the pawl as the sliding piece is raised by the swinging frame, substantially as and for the purpose shown.

27. In a registering apparatus, in combination with a series of keys of different denominations and the registering mechanism to be actuated therefrom, a swinging frame having a bar extending diagonally across the keys, so as to approach nearer and nearer to the pivotal points of the keys as it passes over the keys of lower denomination and having key-engaging surfaces arranged so that an equal movement of different keys will move the frame different distances, and connections between the frame and the registering mechanism, substantially as and for the purpose specified.

28. In a registering apparatus, in combination with a series of keys for causing registration of different amounts, a swinging frame having a bar extending diagonally across the keys, provided with bearing-surfaces for the different keys, arranged at different heights above such keys, and registering mechanism connected with and actuated by the movement of the frame, substantially as and for the purpose described.

29. In a registering apparatus, in combination with a series of key-levers having equal amounts of movement, a swinging frame having a bar extending diagonally across the key-levers and provided with bearing-surfaces to be engaged by such levers, each successive bearing-surface as the bar approaches nearer the pivotal point of the levers being placed a greater portion of the possible swing of the surface-engaging part of the respective key-lever away from such lever, substantially as and for the purpose specified.

30. In a registering apparatus, in combination with the series of key-levers having equal movements, a movable frame having a bar extending from a point over the outer end of the lever at one end of the series diagonally inward across the series of levers and provided with bearing-surfaces for the respective levers, set above the levers successively a greater portion of the possible movement of the engaging point on the respective lever, substantially as and for the purpose shown.

31. In a registering apparatus, in combination with the series of levers pivoted on a suitable shaft, a swinging frame having a bar extending diagonally across the lever series, provided with bearing-surfaces to be engaged by the respective levers, such bearing-surfaces being placed above the levers different fractions of the amounts of possible travel of the surface-engaging points on the lever, substantially as and for the purpose set forth.

32. In a registering apparatus, in combination with the series of levers, the swinging frame having the bar extending diagonally across the lever series, provided with a series of bearing-surfaces to be engaged by the levers so situated with reference to the levers that each successive surface will normally be above its respective lever a distance equal to a greater number of fractions of the possible movement of the engaging point on the lever, substantially as and for the purpose described.

33. In a registering apparatus, in combination with a series of key-levers and a swinging frame having the bar extending diagonally across the lever series so as to pass over points on the levers successively nearer and nearer to the lever-pivots and provided with bearing-surfaces for the levers, of which the outer one bears on the lever at that end of the series, the next stands above its respective lever a distance equal to a certain fraction of the possible movement of the surface-engaging point on the lever, and the succeeding surfaces are farther and farther above their levers by a greater and greater number of similar fractions of the possible travel of the respective lever-engaging points, substantially as specified.

34. In a registering apparatus, in combination with the series of key-levers, the swinging frame having the bar extending diagonally across the series of levers and having the bearing-points to be engaged by the levers, situated on a curved line at different heights along the bar, substantially as and for the purpose shown.

35. In combination with the series of key-levers and the swinging frame, the adjustable bar or bearing-piece thereon extending diagonally across the series of levers and provided with bearing-surfaces at different heights from the respective levers to engage such surfaces, substantially as and for the purpose set forth.

36. In an indicating and registering machine, a series of keys, a movable frame to be moved by any key operated, the adjustable piece consisting of a plate having surfaces to be engaged by the keys pivoted to the frame, so that it can be swung up or down on the latter to adjust its angle with reference to the plane of the keys, and means for fixing it at any desired point of adjustment on the frame, substantially as and for the purpose specified.

37. In combination with a series of key-levers and a register-wheel, suitable connecting mechanism for turning the wheel as any key-lever is moved, a swinging frame resting on the key-levers, and brake mechanism for the register-wheel, actuated by the frame only after the latter has been moved a certain distance by the movement of a key, substantially as and for the purpose specified.

38. In combination with the series of key-levers and a register-wheel turned therefrom through any suitable connection, a brake-lever adapted to engage a brake-surface on the register-wheel, a swinging frame engaging the key-levers, and an arm on the frame adapted to engage the brake-lever only after the frame has moved some distance and then to move it to apply the brake-lever to the brake-surface as the limit of throw of a key is reached.

39. In combination with a series of key-levers, a register-wheel, and suitable connecting mechanism for turning the wheel as any key-lever is operated, ratchet-teeth on the wheel, the brake-lever adapted to engage such teeth, the frame engaged by the key-levers, and an arm on the frame adapted to engage and operate the lever only during the latter part of travel of the frame, substantially as and for the purpose set forth.

40. In combination with a wheel of the registering mechanism and the series of key-levers, the swinging frame provided with the cam-arm, and the brake-lever provided with the adjustable bearing to be engaged by the frame-arm, substantially as and for the purpose described.

41. In combination with the wheel of the registering mechanism provided with the ratchet-teeth, the brake-lever for engaging such teeth, the series of key-levers, and the frame with the brake-lever engaging and actuating arm adapted to engage and operate the brake-lever only as the frame approaches the limit of its travel, substantially as and for the purpose specified.

42. The combination of the registering-ratchet, a movable piece carrying a pawl to engage said ratchet, numbered key-levers arranged below said piece, adapted when moved to actuate the piece to rotate the registering-ratchet a distance corresponding with the number of said key, a stop-ratchet secured to said registering-ratchet concentrically therewith, a stop-lever, and means whereby the actuation of any key-lever causes such stop-lever to engage the stop-ratchet to prevent over rotation of the registering apparatus, substantially as and for the purpose shown.

43. In a cash register and indicator, in combination with a registering-wheel provided with teeth, a series of keys for actuating such wheel, pivoted upon a shaft, a swinging frame pivoted upon the key-supporting shaft and actuated by the operation of any key, a swinging brake-arm having a portion to engage the teeth of the register-wheel to lock it from movement, and connecting mechanism between the swinging brake-arm and the frame, whereby upon the operation of any key the arm is swung to cause it to engage the teeth of the register-wheel, substantially as and for the purpose shown.

44. In a cash register and indicator, in combination with a register-wheel provided with teeth, a series of keys for actuating the wheel through suitable connecting mechanism, a series of indicator-tablet-carrying rods actuated by the keys, a swinging frame actuated by any one of the keys, a brake for engaging the teeth of the wheel to stop the wheel from rotating, and means carried by the frame, adapted to actuate the brake device after the frame has traveled over part of its throw and cause it to engage the teeth of the wheel as the frame reaches the limit of its movement by any key, substantially as and for the purpose shown.

45. In a cash register and indicator, in combination with the series of key-levers and the swinging frame engaging the same, alarm mechanism actuated to sound an alarm as the frame nears the limit of its swing, the movable till lid or cover, and one or more latches for locking the same shut, adapted to be tripped by the frame after the latter has caused the alarm to be sounded, substantially as and for the purpose described.

46. In a cash register and indicator, the combination, with a series of key-levers, of a swinging frame pivoted on the same axis therewith, having a cross-bar to be engaged by the key-levers, and a till-locking latch provided with a portion extending over above a portion of the frame, so as to be moved by the frame, substantially as and for the purpose described.

47. In combination with a series of keys pivoted on a shaft at the front of the machine, a series of tablet-carrying rods operated by the keys, a swinging frame pivoted on the same axis with the levers, having the bar extending across the tops of the keys to the rear of their pivotal support, and the till-locking and alarm-striking mechanisms operated by the swinging frame, so that the locking mechanism is tripped and the alarm mechanism is operated to sound an alarm as the frame is raised by the movement of any keys, substantially as and for the purpose described.

In testimony that I claim the foregoing I have hereunto set my hand this 31st day of May, 1888.

WALES ALDRICH.

Witnesses:
O. M. GOTTSCHALL,
WILLIAM H. RUSSELL.